(12) United States Patent
Yuan

(10) Patent No.: US 8,781,782 B2
(45) Date of Patent: Jul. 15, 2014

(54) SYSTEM AND METHOD FOR CONDITIONAL MULTI-OUTPUT REGRESSION FOR MACHINE CONDITION MONITORING

(75) Inventor: Chao Yuan, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 449 days.

(21) Appl. No.: 13/226,863

(22) Filed: Sep. 7, 2011

(65) Prior Publication Data
US 2012/0084042 A1    Apr. 5, 2012

Related U.S. Application Data

(60) Provisional application No. 61/388,127, filed on Sep. 30, 2010.

(51) Int. Cl.
*G05B 17/02* (2006.01)
*G06N 7/00* (2006.01)

(52) U.S. Cl.
CPC ............. *G05B 17/02* (2013.01); *G06N 7/005* (2013.01)
USPC ....................................................... 702/116

(58) Field of Classification Search
CPC ...... G06F 17/18; G06N 7/005; G06N 99/005; G05B 17/02
USPC ........................................................ 702/116
See application file for complete search history.

(56) References Cited

U.S. PATENT DOCUMENTS

2010/0235143 A1*  9/2010  Fijany et al. ................. 702/185

OTHER PUBLICATIONS

Boyle et al., "Multiple Output Gaussian Process Regression", Apr. 2005, Victoria University of Wellington Technical Report CS-TR-05/2.*
Hartikainen et al. "Kalman filtering and smoothing solutions to temporal Gaussian Process Regression Models", Sep. 1 2010, 2010 IEEE Intl. Wksp. on Mach. Learn. for Sig. Process.*
Chao Yuan; Conditional Multi Output Regression; pp. 189-196; Neural Networks, The 2011 International Joint Conference; ISBN: 978-1-.4244-9635-8; DOI: 10.1109/IJCNN2011.6033220; xp 031970680.

* cited by examiner

*Primary Examiner* — Jonathan C Teixeira Moffat
*Assistant Examiner* — Regis Betsch

(57) ABSTRACT

A method for predicting sensor output values of a sensor monitoring system, includes providing a set test input values to a system of sensors, and one or more known sensor output values from the sensor system, where other sensor output values are unknown, calculating, for each unknown sensor output value, a predictive Gaussian distribution function from the test input values and the known output sensor values, and predicting each unknown output $y_m$ by integrating over a product of the predictive Gaussian distribution function and a conditional Gaussian distribution of the unknown output sensor values with respect to the test input values and other unknown output sensor values. A mean and covariance of the predictive Gaussian distribution function are determined from a training phase, and a hyperparameter of the conditional Gaussian distribution are determined by another training phase.

14 Claims, 6 Drawing Sheets

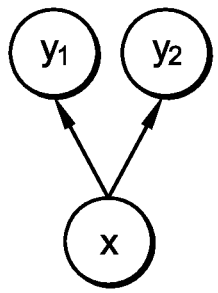 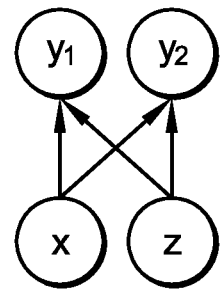
FIG. 1(a)  FIG. 1(b)
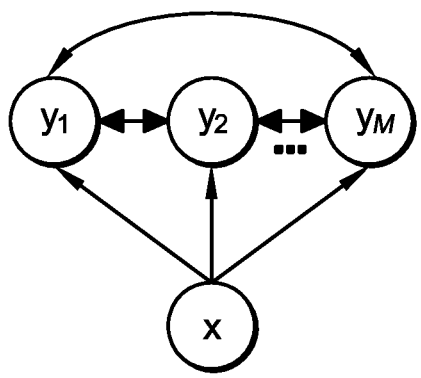 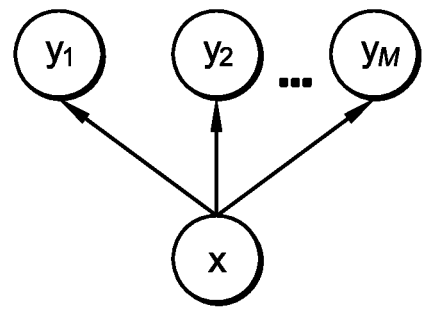
FIG. 2(a)  FIG. 2(b)

FIG. 4

| Tests | Primary variable | Secondary variables |
|---|---|---|
| 1 | cadmium | nickel, zinc |
| 2 | copper | lead, nickel, zinc |
| 3 | lead | copper, nickel, zinc |

FIG. 5

| Tests | ST GP | MT GP | One-pass CG GP | Bonilla GP | Co-kriging |
|---|---|---|---|---|---|
| 1 | 0.56 | 0.56 | 0.42 | 0.43 | 0.58 |
| 2 | 15.5 | 15.5 | 7.5 | 8.4 | 15.4 |
| 3 | 23.4 | 23.5 | 11.0 | 13.2 | 20.9 |

FIG. 6

| Tests | ST GP | MT GP | One-pass CG GP | Bonilla GP | Co-kriging | Convolved GP |
|---|---|---|---|---|---|---|
| 1 | 0.57 | 0.58 | 0.42 | 0.44 | 0.50 | 0.44 |
| 2 | 15.5 | 15.6 | 7.1 | 8.1 | 7.1 | 7.4 |
| 3 | 23.4 | 23.4 | 10.5 | 11.5 | 10.5 | - |

SYSTEM AND METHOD FOR CONDITIONAL MULTI-OUTPUT REGRESSION FOR MACHINE CONDITION MONITORING

CROSS REFERENCE TO RELATED UNITED STATES APPLICATIONS

This application claims priority from "Conditional Multi-Output Regression For Machine Condition Monitoring", U.S. Provisional Application No. 61/388,127 of Chao Yuan, filed Sep. 30, 2010, the contents of which are herein incorporated by reference in their entirety.

TECHNICAL FIELD

This disclosure is directed to methods for monitoring the condition of a machine based on sensor output.

DISCUSSION OF THE RELATED ART

Monitoring the condition of an expensive device or machine, such as a power plant or an airplane, has received increasing interest in recent years. The goal is to detect failures of these machines at an early stage to avoid subsequent catastrophic damage. This may be achieved by analyzing the values from a set of sensors installed in different parts of a machine. When correlations among the sensor values are violated, there is likely to be a failure. One important aspect of modeling such correlations is the ability to accurately predict process outputs based on process inputs. This naturally forms a multi-output regression that aims to learn a mapping from the input space to a M-dimensional output space.

Multi-output regression aims at learning a mapping from the input space to an M-dimensional output space. Given the fact that outputs are usually dependent to each other, previous studies have focused on modeling the correlation or the joint predictive distribution of outputs. The learned joint predictive distribution can then be applied to a wide variety of problems.

The following conditional multi-output regression is of interest. For a test input, if some outputs are additionally known, how can this extra information be used to improve a prediction on the remaining outputs? For example, at a geographic location, given the concentration of a metal that is less expensive to measure, can one estimate the concentration of another metal? In financial markets, does the earning release of company A help to better forecast the earning release of company B? In many modern monitoring systems, sensor values are transferred in real-time from the machine to the diagnostic center. But they often come sequentially instead of simultaneously due to network issues.

Can these available sensor values be used to help predict other missing sensor values? If the inputs are a Markov blanket of outputs, for example, in FIG. 1(a) where there are two outputs $y_1$ and $y_2$ conditioned on inputs x, there is no advantage of doing so. This is because given x, $y_1$ and $y_2$ are conditionally independent such that $P(y_1|x, y_2) = P(y_1|x)$. Thus, using other output $y_2$ as inputs does not help. However, some inputs may be hidden as shown in FIG. 1(b), where input z is never observed. This is a more realistic scenario, because it is challenging to measure all inputs in real datasets. In such cases, $y_2$ carries information about the missing z and is expected to improve the prediction of $y_1$ if used as an input.

Previous approaches usually tackle this task by inferring the unknown outputs conditionally from the known outputs based on their joint predictive distribution. However, learning the joint predictive distribution is quite challenging, especially when the regression mapping is nonlinear. Because multi-output regression can be viewed as a special case of multi-task learning, when regression tasks share the same inputs, many multi-task techniques are also applicable to multi-output regression tasks. However, most of these techniques focus on sharing representation and parameters among M single-output tasks. In prediction, all single-output models work independently without considering their correlations.

SUMMARY OF THE INVENTION

Exemplary embodiments of the invention as described herein generally include methods and systems for conditional multi-output regression. A method according to an embodiment of the invention includes two models. In a conditional model according to an embodiment of the invention, given M outputs, each output is dependent on the inputs and all other M−1 outputs. By doing this, the other outputs may be viewed the same as the inputs, and thus the original multi-output task may be broken into simpler single-output tasks. If all of the other M−1 outputs are known, this conditional model alone gives prediction of the target output. Otherwise, generative model according to an to embodiment of the invention may be used to infer unknown outputs based on inputs, and uncertainties are then propagated to the conditional model to make a final prediction. Note that the terms "conditional" and "generative" are with respect to outputs, not inputs.

A framework according to an embodiment of the invention is very general. Various existing regression techniques can be used in the conditional model according to other embodiments of the invention. An even broader range of algorithms, as long as they provide error bars for their predictions, can be used for the generative model according to other embodiments of the invention.

According to an aspect of the invention, there is provided a method for predicting sensor output values of a sensor monitoring system, including providing a set of one or more test input values to a system of sensors, and one or more known sensor output values from the sensor system, where other sensor output values are unknown, calculating, for each unknown sensor output value, a predictive Gaussian distribution function $$P(y_U | x) = \prod_{m \in U} P(y_m | x)$$

$$= \frac{1}{(2\pi)^{d/2} |S_{y_U}|^{1/2}} \exp\left(-\frac{1}{2}(y_U - \mu_{y_U})^T S_{y_U}^{-1} (y_U - \mu_{y_U})\right)$$

from the test input values, where vector x of dimensionality d represents the test input values, vector $y_U$ of dimensionality M represents the set of unknown output sensor values, $y_m \in y_U$, $\mu_{y_U}$ is a vector of mean values of the set $y_U$ determined by a training phase, $S_{y_U}$ is a diagonal covariance matrix of the set $y_U$ determined by the training phase; and predicting each unknown output $y_m$ from $P(y_m|x, y_O) = \int_{y_{\bar{U}\bar{m}}} P(y_m|x, y_{\bar{U}\bar{m}}) P(y_{\bar{U}}|x) dy_{\bar{U}\bar{m}}$, where vector $y_O$ represents the known sensor output values, vector $y_{\bar{U}\bar{m}}$ represents unknown output sensor values in $y_U$ except $y_m$, and $P(y_m|x, y_{\bar{U}\bar{m}})$ is a conditional Gaussian distribution defined by log $P(y_m|x, y_{\bar{U}\bar{m}}) = -\frac{1}{2}\log|K| - \frac{1}{2}y_{\bar{U}\bar{m}}K^{-1}y_{\bar{U}\bar{m}}^T + C$, where $C = -(0.5\,d)\log(2\pi)$ and K is an N×N kernel matrix defined between pairs of test input values $x_i$, $x_j$ where N is the number of test input values whose elements $K_{i,j}$ are defined by Gaussian kernel functions $K_{i,j} = k(x_i, x_j|\Lambda) = \exp(-\frac{1}{2}(x_i-x_j)^T \Lambda^{-1}(x_i-x_j))$, where $\Lambda = \text{diag}[\lambda_1^2, \ldots, \lambda_d^2]^T$ whose values $\lambda_i$ are determined by another training phase.

According to a further aspect of the invention, the predictive Gaussian distribution function $P(y_m|x)$ for each unknown output $y_m$ is trained by maximizing $\log P(Y_m|X_m, \theta) = -\frac{1}{2} \log|K| - \frac{1}{2} Y_m K^{-1} Y_m^T + C$ with respect to a hyperparameter $\theta = \{\lambda_1, \ldots, \lambda_d\}$, where $Y_m$ is a set of $N_m$ training samples of dimensionality M for sensor output values corresponding to a set $X_m$ of N training samples for sensor input values.

According to a further aspect of the invention, $\log P(Y_m|X_m, \theta) = -\frac{1}{2} \log|K| - \frac{1}{2} Y_m K^{-1} Y_m^T + C$ is maximized using a conjugate gradient method.

According to a further aspect of the invention, the conditional Gaussian distribution $P(y_m|x, y_{U\overline{m}}, y_O)$ is trained by maximizing $\log P(Y_m|X, Y_{\overline{m}}, \theta) = -\frac{1}{2} \log|K| - \frac{1}{2} y_{U\overline{m}} K^{-1} y_{U\overline{m}}^T + C$ with respect to a hyperparameter $\theta = \{\lambda_1, \ldots, \lambda_{d+M-1}\}$, for the training set of input values X and output values Y, where $Y_{\overline{m}}$ is a (M-1)×N matrix that represents training sets for all outputs except $y_m$, where the Gaussian kernel functions $K_{i,j} = k(z_i, z_j|\Lambda) = \exp(-\frac{1}{2}(z_i-z_j)^T \Lambda^{-1}(z_i-z_j))$ where z is a (d+M-1) input vector that combines vectors $x \in X$ and $y_{\overline{m}} \in Y_{\overline{m}}$.

According to a further aspect of the invention, the method includes, when there are $N-N_n$ missing values in the set of output values $Y_m$, sampling a plurality of output values from the predictive Gaussian distribution $P(y_m|x)$ for each missing value in $Y_m$, and maximizing an average over the plurality of sampled values $$\frac{1}{T}\sum_{t=1}^{T} \log P(Y_m^{(t)} | X_m, Y_{\overline{m}}^{(t)}, \theta)$$

with respect to the hyperparameter $\theta$, where T is the number of the plurality of sampled values for each missing value in $Y_m$, where each missing value in $Y_m$ is replaced by a sampled value.

According to a further aspect of the invention, the method includes repeatedly calculating $$Q^{(l+1)}(y_m) = \int_{y_{U_m}} P(y_m|x, y_m) \prod_{i \in U_{\overline{m}}} Q^{(l)}(y_i) dy_{U_m}$$

until convergence, where each $Q^{(1)}(y_m)$ is initialized as $Q^{(1)}(y_m) = P(y_m|x, y_O) = \int_{y_{U\overline{m}}} P(y_m|x, y_{U\overline{m}}) P(y_U|x) dy_{U\overline{m}}$.

According to a another aspect of the invention, there is provided a program storage device readable by a computer, tangibly embodying a program of instructions executable by the computer to perform the method steps for predicting sensor output values of a sensor monitoring system.

BRIEF DESCRIPTION OF THE DRAWINGS

FIGS. 1(a)-(b) illustrates when outputs can be used as extra inputs, according to an embodiment of the invention.

FIGS. 2(a)-(b) graphically represents a modeling framework according to an embodiment of the invention.

FIG. 4 is a table of the primary and secondary variables for the three tests on the Jura dataset, according to an embodiment of the invention.

FIG. 5 is a table of the MAE results for different methods for the Jura data test under the inductive setting, according to an embodiment of the invention.

FIG. 6 is a table of the MAE results for different methods for the Jura data test under the transductive setting, according to an embodiment of the invention.

DETAILED DESCRIPTION OF EXEMPLARY EMBODIMENTS

Figure 3:
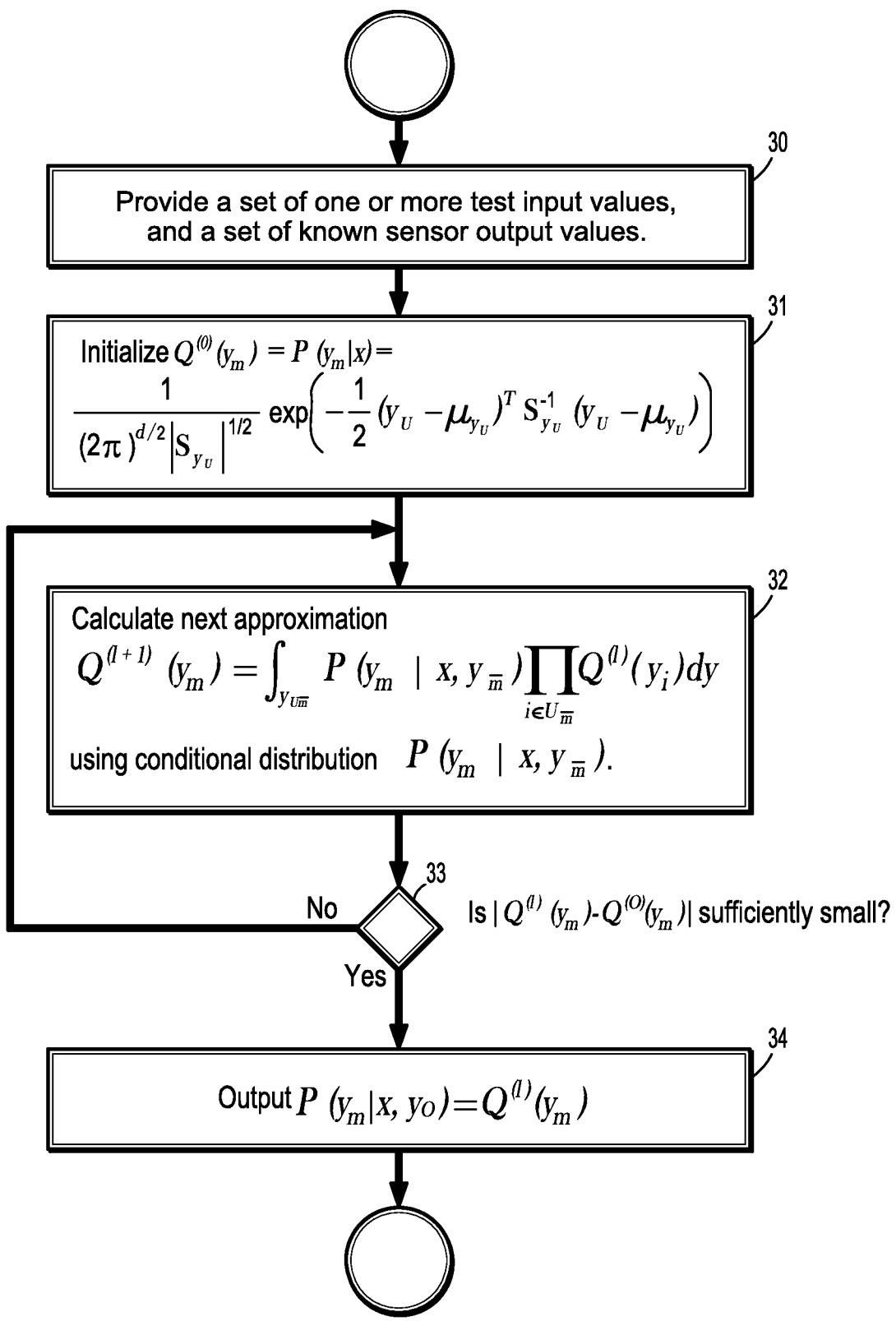
FIG. 3 is a flowchart of an iterative method for conditional multi-output regression, according to an embodiment of the invention.

Exemplary embodiments of the invention as described herein generally include systems and methods for conditional multi-output regression. Accordingly, while the invention is susceptible to various modifications and alternative fauns, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Models:

A standard multi-output regression can learn the mapping $P(y|x)$ from inputs $x \in R^d$ to outputs $y \in R^M$. In a conditional multi-output regression according to an embodiment of the invention, one is additionally given some observed outputs $y_O$. According to an embodiment of the invention, it is desired to predict $y_m$, each of the remaining unknown outputs $y_U$:

$$P(y_m|x, y_O) \quad (1)$$

Both O and U are index sets, forming a partition of the full index set $\{i\}_{i=1}^M$. Equivalently, one has $y = \{y_U, y_O\}$. The notation $U_{\overline{m}} = \{i | i \in U, i \neq m\}$ may be used herein below to denote the index set U excluding m. $y_{U\overline{m}}$ thus represents all outputs in $y_U$ except $y_m$. Similarly, $\overline{m} = \{i | 1 \leq i \leq M, i \neq m\}$ indicates the full index set excluding m such that $y_{\overline{m}} = \{y_{U\overline{m}}, y_O\}$. Note that for a regression (vs. a density estimation), there is no need to calculate the predictive joint distribution of $P(y_U|x, y_O)$ (or consider the predictive covariance among outputs $y_U$) because the goal of regression is to give an estimate of each $y_m$ close to its ground truth value.

In prior single generative models, the joint predictive distribution $P(y|x)$ is learned, which solves a more general task. Once $P(y|x)$ is known, such as a multivariate Gaussian distribution, the full joint predictive distribution of $P(y_U|x, y_O)$ can be derived directly. However, learning $P(y|x)$ is quite challenging. Without a sparse approximation, popular prior methods require a formidable complexity of $O(M^3 N^3)$, and the learned distribution is often inaccurate.

It is tempting to ask the following question: can one solve this regression task only using standard regression algorithms? A straightforward way is to learn a regression model for every $P(y_m|x, y_O)$ during training. However, because one does not know beforehand which outputs will be unknown or available during testing, all possible scenarios need to be considered during training. This requires a total of $M \times 2^{M-1}$ predictors, which soon becomes intractable as M increases.

According to an embodiment of the invention, a two-model framework transforms the original multi-output regression task into 2M single-output regression tasks. Specifically, to predict each unknown output $y_m$, where $m \in U$, a Bayesian integration is performed over other unknown outputs $y_{U\overline{m}}$:

$$P(y_m|x, y_O) = \int_{y_{U\overline{m}}} P(y_m|x, y_{U\overline{m}}) P(y_{U\overline{m}}|x, y_O) dy_{U\overline{m}} \quad (2)$$

In a conditional model according to an embodiment of the invention, one directly models $P(y_m|x, y_{\bar{m}})$, the first factor in the integrand of EQ. (2). A total of M conditional probabilities are specified, with each output $y_m$, conditioned on inputs x and the remaining outputs $y_{\bar{m}}$.

In a generative model according to an embodiment of the invention, $P(y_{U\bar{m}}|x, y_O)$, the second factor in the integrand of EQ. (1) is modeled. The generative model is used to infer other unknown outputs. The uncertainty of other outputs is then propagated to the conditional model through the Bayesian integration to make the final prediction.

Previous generative approaches that give joint predictive distribution are straight candidates for a generative model according to an embodiment of the invention. However, due to above noted limitations, an independent generative model is considered, in which, given the inputs, all outputs are independent. The second part in the integrand of EQ. (2) now becomes:

$$P(y_{U\bar{m}}|x, y_O) = \prod_{i \in U\bar{m}} P(y_i|x). \quad (3)$$

$y_O$ is omitted on the right side of EQ. (3) because it is independent of $y_{U\bar{m}}$ given inputs x. A generative model according to an embodiment of the invention therefore comprises M regression predictors, each predicting an output from inputs. This is computationally more efficient than a full generative model. As will be shown, even with such a simple model, a method according to an embodiment of the invention can achieve significant performance improvements. In addition, an iterative algorithm according to an embodiment of the invention uses this simple generative model as an initial approximation to $P(y_{U\bar{m}}|x, y_O)$, and refines this approximation through iterations.

FIGS. 2(a)-(b) graphically represents a framework according to an embodiment of the invention, where the arrows indicate dependency. In a conditional model according to an embodiment of the invention, illustrated in FIG. 2(a), the dependency of each output is modeled on both the inputs and the remaining M−1 outputs. In a generative model according to an embodiment of the invention, illustrated in FIG. 2(b), the dependency of each output is modeled only on the inputs.

According to an embodiment of the invention, Gaussian processes are used as the basic predictors for each of the 2M regression tasks. Given training data X and Y, containing N training samples for inputs x and output y, respectively, to learn the mapping from x to y, a Gaussian process assumes that Y has a Gaussian distribution of $$P(Y|X) = N(Y|0, K + \sigma^2 I) \quad (4)$$

$$= \frac{1}{(2\pi)^{d/2}|K+\sigma^2 I|^{1/2}} \exp\left(-\frac{1}{2}Y^T(K+\sigma^2 I)^{-1}Y\right),$$

where Y is a N-dimensional vector of output training samples, X is a vector of d-dimensional input training samples $x_i$, where i=1, N, I is an identity matrix and $\sigma^2$ is the prediction noise variance. The kernel matrix K considered here is an N by N matrix that comprises Gaussian kernel functions between pairs of inputs $X_i$ and $X_j$:

$$k(x_i, x_j|\Lambda) = \exp(-\frac{1}{2}(x_i-x_j)^T \Lambda^{-1}(x_i-x_j)), \quad (5)$$

where $\Lambda = \text{diag}[\lambda_1^2, \ldots, \lambda_d^2]^T$ includes squared length scales, allowing automatic relevance determination of each input dimension to predict the output $y_m$. The hyperparameter $\theta$ of the Gaussian process is thus $\{\lambda_1, \ldots, \lambda_d, \sigma\}$.

In general, the Gaussian form for $P(y|x)$ may be written as $$P(y|x) = N\left(y \left| \sum_{n=1}^{N} \beta_n k(x, x_i), \gamma^2 I \right.\right) \quad (6)$$

$$= \frac{1}{(2\pi)^{1/2}|\gamma^2|^{1/2}} \exp\left(-\frac{1}{2\gamma^2}\left(y - \sum_{n=1}^{N} \beta_n k(x, x_i)\right)^2\right)$$

where and $\beta_n$, $\gamma^2$ are constant parameters determined by the training process.

Once both a conditional model and a generative model according to embodiments of the invention have been learned, EQ. (2) can be evaluated. The choice of using Gaussian kernel functions is useful for allowing EQ. (2) to be analytically evaluated. A variety of other probabilistic regression algorithms can be used in other embodiments of the invention, as long as they use Gaussian kernel functions that make the Bayesian integration tractable. An exemplary, non-limiting list of such techniques includes a relevance vector machine, Bayesian support vector regression, and Gaussian processes.

Training:

There are a total of 2M Gaussian processes to be learned with M processes for a generative model according to an embodiment of the invention and the other M processes for a conditional model according to an embodiment of the invention. Training the models breaks down to training each of the 2M Gaussian process predictors independently. Suppose that there are N training samples for the inputs, denoted by $X = \{x_n\}_{n=1}^{N}$, and $N_m$ training samples for the outputs $y_m$, denoted by $Y_m = \{y_{m,n}\}_{n=1}^{N_m}$. Each $y_m$ corresponds to $N_m$ input training samples, denoted by $X_m = \{x_{m,n}\}_{n=1}^{N_m}$, where $X_m \subseteq X$.

Two cases may be considered. In the first case, the training data are complete: $X_m = X$ and $N_m = N$ for all outputs. In other words, for every input sample $X_n$ and for every output $y_m$, there is a corresponding training sample $y_{m,n}$. Thus, all input and output training data form a (d+M)×N matrix. In the second case, the training data contain missing entries: some outputs $y_m$ may only correspond to its particular input training set $X_m$ instead of the common input training set X. In this case, the size of $Y_m$ or $N_m < N$. This is equivalent to say that there are $N - N_m$ missing values in $y_m$.

A. Training the Generative Model

For a generative model according to an embodiment of the invention, learning the Gaussian process for predicting output $y_m$ is equivalent to learning the hyperparameter vector $\theta$ which maximizes the following log likelihood:

$$\log P(Y_m|X_m, \theta) = -\frac{1}{2}\log|K| - \frac{1}{2}Y_m K^{-1} Y_m^T + C, \quad (7)$$

where the covariance matrix K contains $\theta$ and C is a constant term. According to an embodiment of the invention, $C = -(0.5\,d)\log(2\pi)$, where d is the dimensionality of the input samples. According to an embodiment of the invention, a conjugate gradient method may be used to search for $\theta$.

B. Training the Conditional Model

According to an embodiment of the invention, the first case assumes that the training data are complete ($X_m = X$). In the conditional model, each predictor has a new log likelihood to be maximized:

$$\log P(Y_m|X, Y_{\bar{m}}, \theta) \quad (8)$$

where $Y_{\bar{m}}$ is a $(M-1){\times}N$ matrix, representing the training sets for all outputs except $y_m$. EQ. (8) is very similar to EQ. (7) except that a new $(d+M-1)$-dimensional input vector z combining x and $y_{\bar{m}}$ is used, There are thus $d+M-1$ length scales in the corresponding $\Lambda$ and $\theta$. Here, the $P(y_m|x, y_{\bar{m}}, \theta)$ may be represented by the Gaussian of EQ. (6), with Gaussian kernel $k(z_i, z_j|\Lambda) = \exp(-\frac{1}{2}(z_i-z_j)^T \Lambda^{-1}(z_i-z_j))$ where $\Lambda = \text{diag}[\lambda_1^2, \ldots, \lambda_{d+m-1}^2]^T$.

According to an embodiment of the invention, the second case considers the missing data. In this case, for some output $y_m$, there are $N-N_m$ missing values in $y_m$. According to an embodiment of the invention, these missing entries can be sampled using the already learned generative model. Specifically, for every missing entry in every $Y_m$, the corresponding predictive distribution from the generative model can be used to sample a value and put it at the missing position in $Y_m$. Such sampling is repeated T times. An exemplary, non-limiting value for T is 10. Now there are T sets of output training data, each denoted by $\{Y_m^{(t)}\}_{m=1}^M$, where $t=1, 2, \ldots; T$. Every $Y_m^{(t)}$ now contains N values. We also use $Y_{\bar{m}}^{(t)}$ to denote the t-th set of output training data excluding $Y_m^{(t)}$. The log likelihood is now maximized with an average evidence term from T sampled regression problems $$\frac{1}{T}\sum_{t=1}^{T} \log P(Y_m^{(t)} | X_m, Y_{\bar{m}}^{(t)}, \theta). \tag{9}$$

Gaussian process has a training complexity of $O(N^3)$. Training 2M Gaussian processes to has a total cost of $O(MN^3)$, which is significantly smaller than $O(M^3N^3)$ needed by previous generative approaches, but can still be high for a large N. According to embodiments of the invention, various sparse Gaussian processes can achieve a smaller training complexity of $O(\kappa^2 N)(\kappa{\ll}N)$, which can replace a Gaussian process used in a model according to an embodiment of the invention. An exemplary, non-limiting list of such techniques includes sparse online Gaussian processes, sparse greedy Gaussian process regression, and sparse Gaussian processes using pseudo-inputs.

Prediction:

A. A One-Pass Algorithm

In prediction, given the test inputs x and additional known outputs $y_O$, the task is to predict each unknown $y_m$ using EQ. (2). According to an embodiment of the invention, one first calculates the predictive distribution for all unknown outputs $y_U$ from the generative model:

$$P(y_U | x) = \prod_{m \in U} P(y_m | x) \tag{10}$$
$$= N(y_U | \mu_{y_U}, S_{y_U})$$
$$= \frac{1}{(2\pi)^{d/2}|S_{y_U}|^{1/2}} \exp\left(-\frac{1}{2}(y_U - \mu_{y_U})^T S_{y_U}^{-1}(y_U - \mu_{y_U})\right)$$

This is a Gaussian distribution with mean $\mu_{y_U}$ and a diagonal covariance matrix $S_{y_U}$, which may be determined by the training process. EQ. (10) has a factorized form due to the independence assumption. Second, each unknown output $y_m$ is predicted in turn using EQ. (2). The issue of how to perform the Bayesian integration analytically will be described in the next section.

Alternatively, EQ. (10) can be simplified such that the distribution of each $y_m$ shrinks to a point:

$$P(y_m|x) = \delta(y_m - \mu_{y_m}) \tag{11}$$

The delta function $\delta(\ )$ can be viewed as a probability density function with $\int_{y_m} \delta(y_m - \mu_{y_m}) dy_m = 1$. It is defined as $\delta(y_m - \mu_{y_m}) = \infty$ if $y_m = \mu_{y_m}$ and $\delta(y_m - \mu_{y_m}) = 0$ otherwise. This is equivalent to assuming that all variances of the Gaussian distributions in EQ. (10) go to zero. In this case, EQ. (2) is simply $P(y_m|x, y_O) = P(y_m|x, \mu_{y_{U\bar{m}}}, y_O)$, which is a Gaussian with mean $\mu_{y_{U\bar{m}}}$.

B. An Iterative Algorithm

If $P(y_m, x, y_O)$, the result from the above one pass algorithm, is viewed as a refinement for $P(y_m|x)$, the predictive distribution from the generative model, can one continue refining the result iteratively? To achieve this, according to an embodiment of the invention, it is assumed that $P(y_U|x, y_O)$ is unknown and can be factorized as $$P(y_U | x, y_O) \approx \prod_{m \in U} Q(y_m). \tag{12}$$

$Q(y_m)$ is an approximation to the ground truth posterior distribution $P(y_m|x, y_O)$. EQ. (2) can now be written into the following iterative form:

$$Q^{(l+1)}(y_m) = \int_{y_{U\bar{m}}} P(y_m | x, y_{\bar{m}}) \prod_{i \in U_{\bar{m}}} Q^{(l)}(y_i) dy_{U\bar{m}}. \tag{13}$$

$Q^{(l+1)}(y_m)$ denotes the result after $l+1$ iterations. In the $(l+1)$-th iteration, all posterior distributions $Q(y_m)$ are updated, where $m \in U$, using the results from the l-th iteration.

An iterative algorithm according to an embodiment of the invention may be initialized by setting $Q^{(0)}(y_m) = P(y_m|x)$, the predictive distribution from the generative model. Thus, the first iteration is the same as that in a one pass algorithm according to an embodiment of the invention. After this, the generative model is not needed. Once the algorit FIG. 3 is a flowchart of an iterative method for conditional multi-output regression, according to an embodiment of the invention. Referring now to the figure, after providing, at step 30, a set of one or more test input values, and a set of known sensor output values, an iterative algorithm according to an embodiment of the invention begins at step 31 by initializing each $Q^{(0)}(y_m) = P(y_m|x)$, the predictive distribution from the generative model. Then, at step 32, $$Q^{(l)}(y_m) = \int_{y_{U\bar{m}}} P(y_m | x, y_{\bar{m}}) \prod_{i \in U_{\bar{m}}} Q^{(0)}(y_i) dy_{U\bar{m}}$$

is calculated using conditional distribution $P(y_m|x, y_{\bar{m}})$. At step 33, $Q^{(1)}(y_m)$ and $Q^{(0)}(y_m)$ are compared for convergence, and if the difference is insufficiently small, step 32 is repeated for each $y_m$, using the previous result for Q in the product in right hand side. Once the $Q^{(l+1)}(y_m)$ have converged, $P(y_m|x, y_O) = Q(y_m)$ is output at step 34.

If a Dirac delta function is used for the generative model, the variance of the Gaussian result for $P(y_m|x, y_O) = P(y_m|x, \mu_{y_{U\bar{m}}}, y_O)$ is set to zero, and the resulting delta function is used to initialize the $Q^{(1)}(y_m)$ in the product on the right-hand-side of EQ. (13). This is repeated after every iteration so that every Gaussian distribution on the left side of EQ. (13) becomes a delta function on the right side of EQ. (13) in the next iteration.

This iterative algorithm according to an embodiment of the invention converges very well in practice. Unlike prior approximate inference methods that require the full joint distribution of variables to be specified, for example, in a form of Bayesian network or Markov network, a method according to an embodiment of the invention does not need to find the real dependencies among variables.

There is a special case when no additional outputs are known, i.e., O is empty. In this case, the advantage of using the conditional model (using information from extra outputs) is lost. Therefore, a method according to an embodiment of the invention would not be expected to outperform other generative models in this scenario.

There is also a trivial case when M−1 outputs are known. In this case, there is only one output to predict and there are no uncertainties from the other outputs. Thus, the generative model is not needed and the Bayesian integration produces the same results as a point estimation. An iterative algorithm according to an embodiment of the invention is also unnecessary.

C. Bayesian Integration

The question of how to perform the Bayesian integration in EQ. (2) analytically will now be addressed. From the conditional model, $P(y_m|x, y_{U\bar{m}})$ has a Gaussian distribution of $$N(y_m | \mu_{y_m}, s_{y_m}) = \frac{1}{(2\pi)^{d/2}|s_{y_m}|^{1/2}} \exp\left(-\frac{1}{2}(y_m - \mu_{y_m})^T (s_{y_m})^{-1}(y_m - \mu_{y_m})\right).$$

Specifically, $$\mu_{y_m} = \sum_{i=1}^{N_m} \beta_i k(z, z_{m,i} | \Lambda_z), \quad (14)$$

$$s_{y_m} = \sigma_{y_m}^2 - \sum_{i=1}^{N_m}\sum_{j=1}^{N_m} \gamma_{ij} k(z, z_{m,i} | \Lambda_z) k(z, z_{m,j} | \Lambda_z), \quad (15)$$

where z is a combined vector of $[x^T y_O^T y_{U\bar{m}}^T]^T$ and $$k(z, z_{m,n}|\Lambda_z) = K(x, x_{m,n}|\Lambda_x) k(y_O, y_{O,n}|\Lambda_{y_O}) k(y_{U\bar{m}}, y_{U\bar{m},n}|\Lambda_{y_{U\bar{m}}}) \quad (16)$$

$z_{m,i}$ (or $y_{m,i}$, $y_{O,i}$ and $y_{U\bar{m},i}$) are all known training data. According to an embodiment of the invention, it is assumed that the training data are complete, and the case of missing data case is addressed at the end of this subsection. Hyperparameters $\Lambda_x$, $\Lambda_{y_O}$, $\Lambda_{y_{U\bar{m}}}$ contain squared length scales for corresponding dimensions and $\sigma_{y_m}^2$ is the noise variance. These are all learned and fixed after training. The results of EQ. (14) and EQ. (15) come from the standard Gaussian process predictive distribution. Both $\beta_i$ and $\gamma_{ij}$ are constant after training.

From the generative model, $P(y_{U\bar{m}}|x, y_O)$ is another Gaussian distribution (see EQ. (10)):

$$P(y_{U\bar{m}}|x, y_O) = N(y_{U\bar{m}}|\mu_{y_{U\bar{m}}}, S_{y_{U\bar{m}}}) \propto k(y_{U\bar{m}}, \mu_{y_{U\bar{m}}}|S_{y_{U\bar{m}}}), \quad (17)$$

where $S_{y_{U\bar{m}}}$ denotes the diagonal covariance matrix. Unfortunately, the integral in EQ. (2) is now analytically intractable because $y_{U\bar{m}}$ is embedded in the kernel functions in EQS. (14) and (15).

According to an embodiment of the invention, EQ. (2) can be approximated by a Gaussian distribution:

$$P(y_m|x, y_O) \approx q(y_m) = N(y_m|v_{y_m}, \xi_{y_m}). \quad (18)$$

This breaks down to matching the mean and variance between $q(y_m)$ and $P(y_m|x, y_O)$ in EQ. (2). For calculating mean $V_{y_m}$, after first integrating over $y_m$t, one has $$v_{y_m} = \int_{y_{U\bar{m}}} \mu_{y_m} N(y_{U\bar{m}}|\mu_{y_{U\bar{m}}}, S_{y_{U\bar{m}}}) dy_{U\bar{m}}. \quad (19)$$

Using the fact that $\int_u k(x_1, u|\Lambda_1)k(u, x_2|\Lambda_2)du \propto k(x_1, x_2|\Lambda_1+\Lambda_2)$, $v_{y_m}$ can be proved to have an analytical form:

$$v_{y_m} = \sum_{n=1}^{N_m} \beta_n |\Lambda_{y_{U_m}}^{-1} S_{y_{U_m}} + I|^{-1/2} \quad (20)$$

$$k(x, x_{m,n} | \Lambda_x)$$

$$k(y_O, y_{O,n} | \Lambda_{y_O})$$

$$k(\mu_{y_{U_m}}, y_{U_{m,n}} | \Lambda_{y_{U_m}} + S_{y_{U_m}})$$

EQ. (20) implies that if the prediction of $y_{U\bar{m}}$ is accurate with small variances in the diagonal of $S_{y_{U\bar{m}}}$, then $S_{y_{U\bar{m}}}$ becomes negligible compared to $\Lambda_{y_{U\bar{m}}}$, and the posterior mean $v_{y_m}$ is approximately the same as EQ. (14), with $y_{U\bar{m}}$ replaced by $\mu_{y_{U\bar{m}}}$. This is exactly the point estimation case. If an element in $y_{U\bar{m}}$ has a relatively large variance in the corresponding location of $S_{y_{U\bar{m}}}$, the corresponding dimension become less relevant in evaluating EQ. (20) and at the same time the whole value of EQ. (19) shrinks a little towards 0, the prior mean of the Gaussian process.

Recall that if training data contain missing entries, sampling is performed to augment the training data. For each of the T=10 sampled $Y_{\bar{m}}^{(t)}$, one obtains one predictive distribution $q(y_m)$ in EQ. (18). These ten results are then averaged to give the final predictive distribution.

Test Results

Tests were conducted on the Jura dataset, a robot arm dataset and a truck dataset. For all datasets, each data dimension were normalized to zero mean and unit variance for training and testing. The standardized mean squared error (MSE) calculated in the normalized domain was used to evaluate results. For the Jura data only, to be able to compare with existing published results, a mean absolution error (MAE) was used, calculated after results are unnormalized into their original scales.

The following methods are compared (GP stands for Gaussian process). The last four are methods according to embodiments of the invention.

Single Task (ST) GP: This model learns each output independently as a single task, and is equivalent to a generative model according to an embodiment of the invention.

Multi-Task (MT) GP: This model extends a GP to multi-task work, which performs clusterings on tasks (outputs), and in which the logistic regression classifier is replaced by a GP. In prediction, each GP works independently.

Bonilla GP: This is an implementation of the method disclosed in Bonilla, et al., "Multi-task Gaussian Process Prediction", Advances in Neural Information Processing Systems 20, MIT Press, 2008, the contents of which are herein incorporated by reference in their entirety. This method uses a single generative model to model the joint predictive distribution of all outputs. Specifically, all output training samples are modeled by a single Gaussian process. Unknown outputs are then predicted conditionally from the known outputs. A Cholesky decomposition is used for its $K^f$ matrix and no sparse approximation is considered.

One-pass CG GP: This is a one-pass version of a method according to an embodiment of the invention using GP in both conditional and generative models with Bayesian integration.

One-pass Point CG GP: This is the same as the above method except that only point estimation (using delta function) is considered.

Iterative CG GP. This is the iterative version of a method according to an embodiment of the invention with Bayesian integration.

Iterative Point CG GP. This is the same as above method except using point estimation.

Conditional model predictors and simple generative model predictors were trained independently. Training can be conducted in an EM-like algorithm. In the E-step, the posterior distribution $Q(y_m)$ is refined in an iterative algorithm according to an embodiment of the invention. In the M-step, $Q(y_m)$ is used to sample the missing data and learn the parameters of the predictors. This training scheme can also be viewed as a transductive test, as the models are trained and the missing entries are predicted simultaneously.

A. Jura data: The Jura dataset (www.ai-geostats.org) comprises measurements of concentrations of seven heavy metals (cadmium, cobalt, chromium, copper, nickel, lead and zinc) in the Swiss Jura Mountains. There are a total of 359 locations, divided into a fixed training set (259 locations) and a test set (100 locations). The following three tests were considered. Each was to predict the concentration of a primary variable from the concentrations of some secondary variables and the x, y coordinates at a location. For test 1, the primary variable is cadmium, and the secondary variables are nickel and zinc. For test 2, the primary variable is copper, and the secondary variables are lead, nickel and zinc. For test 3, the primary variable is lead, and the secondary variables are copper, nickel and zinc. These variable settings are displayed in the table of FIG. 4.

A first set of the above three tests were repeated in an inductive manner, in which only the training set is available during training. During testing, given the test location, the concentration of the primary variable was predicted using known secondary variables. For example, in test 1, there are d=2 inputs and M=3 outputs, and there is only one output, cadmium, to predict given a test location and other two outputs, nickel and zinc.

This is an ideal test to answer the question raised above: when does it make sense to use outputs as extra inputs? Because the training data have no missing values and all secondary variables are known during the testing stage, a generative model according to an embodiment of the invention is not needed here. Under this setting, all methods produce the same result. Thus, only the results from a One-pass CG GP according to an embodiment of the invention are rerouted. The table of FIG. 5 shows the MAE results for different methods. In addition, the best scores using the Co-kriging method in an isotopic situation, disclosed in P. Goovaerts, "Ordinary cokriging revisited", Mathematical Geology, 30:21-42, 1998, the contents of which are herein incorporated by reference in their entirety, are reported.

A second set of the above three tests were repeated under a transductive setting (referred to as a heteropic situation and a collocated situation in Goovaerts), in which both training data and the secondary variable test data are available during training. The task is to simultaneously perform training and predict the missing primary variable in the test data. Recall that algorithms according to embodiments of the invention are formulated under an inductive setting: models according to embodiments of the invention are fixed during testing. Methods according to embodiments of the invention are adapted under the transductive setting by removing values of the primary variable at test locations during training, and by simulating the missing data cases.

The table of FIG. 6 shows the results. The table also reports the best mean scores from a full convolved GP disclosed in M. Alvarez and N. D. Lawrence, "Sparse convolved Gaussian processes for multi-output regression", Advances in Neural Information Processing Systems 21, MIT Press, 2009, the contents of which are herein incorporated by reference in their entirety, which does not conduct test three and does not consider the inductive setting. A One-pass CG GP method according to an embodiment of the invention performs the best in the inductive test and produces top scores comparable to those from Co-kriging in the transductive test. Besides coordinates of a location, the real inputs to determine the metal concentration should include earth activity, pollution and weather history. Such missing information is carried by other outputs (concentrations of other metals) and can be recovered if those known outputs are used as extra inputs.

Most methods perform better under the transductive setting than under the inductive setting, because of the extra information. The Bonilla GP, the convolved GP and the Cokriging are very competitive on this dataset and all of them can be viewed as using Gaussian process to model the joint predictive distribution. This seems to be a good generative model for this Jura dataset.

B. Robot arm data: A dataset generated from a realistic simulation of the dynamics of a Puma 560 robot arm (www.cs.toronto.edui-delve/data/pumadyn/desc.html) was used. The code is based on the MATLAB code for Pumadyn-8 written by Zoubin Ghahramani. Specifically, four joints were considered, where each joint has an angle, an angular velocity and a torque, for a total of d=4×3=12 dimensional inputs. There are four outputs of the system, each indicating the angular acceleration of a joint. This thus forms an M=4 multi-task problem. The $\gamma$, a parameter for unpredictability, is set to 0.3.

A total of 1000 data points were generated, which were split equally into a training set and a test set. The complete training data was used for training, without missing values. Therefore, no sampling is done in training. But the number of known outputs $M_O$ was varied from 0 to 3. For example, when $M_O=2$, the inputs and two randomly selected known outputs were used to predict each of the two unknown outputs. For each $M_O$ and each method, a total of ten random runs are performed.

Figure 7:
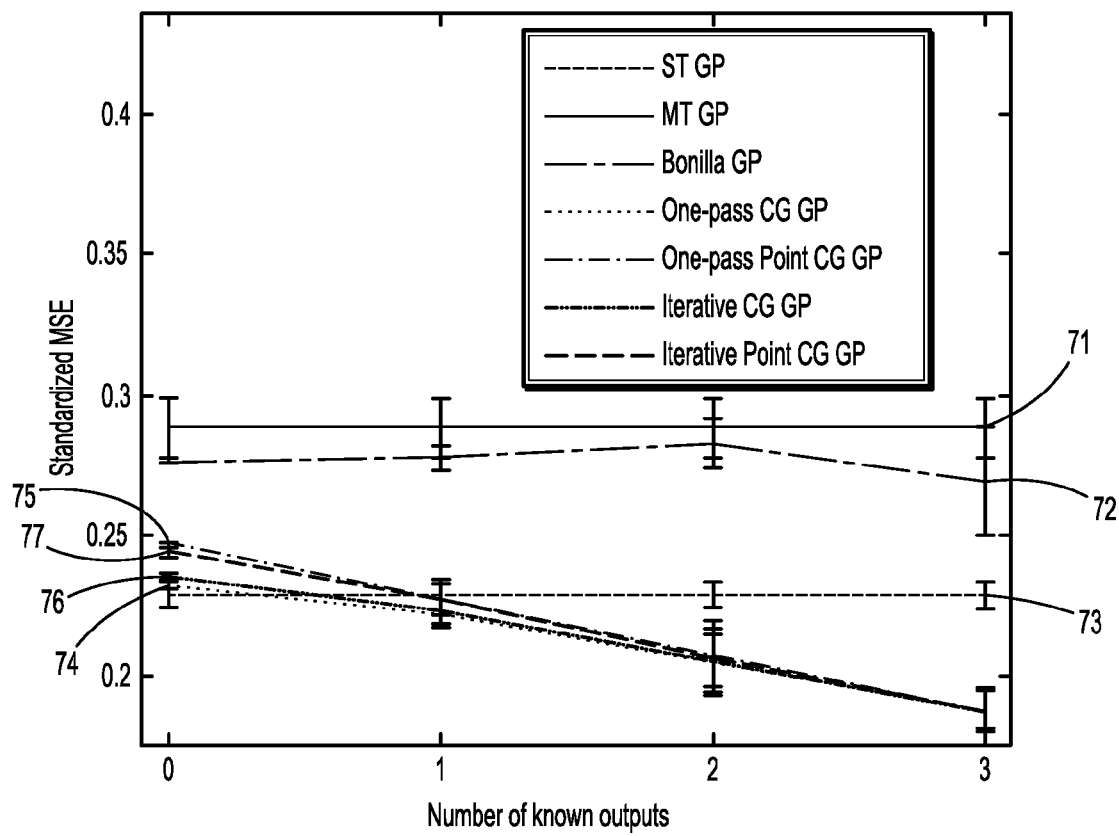
FIG. 7 shows the standardized MSE results for different methods in the Puma560 test, according to an embodiment of the invention.

FIG. 7 shows the standardized MSE results, with one standard deviation error bar, for the different methods in the Puma560 test, as a function of the number of known outputs $M_O$. In the figure, the plots are: (71) ST GP; (72) MT GP; (73) Bonilla GP; (74) One-pass CG GP; (75) One-pass Point CG GP; (76) Iterative CG GP; and (77) Iterative Point CG GP. The ST GP turns out to be a very good performer in this test. Both the MT GP and Bonilla GP perform worse even though they represent more advanced techniques. This implies that the angular accelerations at different joints behave so differently that modeling them jointly may be a rather challenging task. Note that the results from ST GP and MT GP do not change with $M_O$.

The ST GP also performs better than methods according to embodiments of the invention at $M_O=0$. This is not unexpected because in this case no outputs are known and the benefit of using the conditional model is lost. However, as $M_O$ increases, methods according to embodiments of the invention start to take advantages of the additional information and perform better.

Among the methods according to embodiments of the invention, those using Bayesian integration such as One-pass CG GP perform better than the point estimation counterparts such as One-pass Point CG GP. The iterative method does not show clear advantage over its one-pass counterpart. This may be attributed to the good performance of the ST GP, which is also used in a generative model according to an embodiment of the invention. With a good initialization from the ST GP, an iterative method according to an embodiment of the invention should converge very fast such that the final result is close to that from the first iteration. At $M_O=M-1=3$, the results from methods according to embodiments of the invention are identical because no Bayesian integration and no iterations are performed.

Truck data: Monitoring the condition of expensive devices such as power plants and airplanes has received increasing interests in recent years. The goal is to detect failures of these machines at an early stage to avoid catastrophic damages. This is usually achieved by analyzing the values from a set of sensors installed in different parts of a machine. When correlations among the sensor values are violated, there is likely to be a failure. One important aspect of modeling such correlations is the ability to accurately predict process outputs based on process inputs.

However, sensors can fail, resulting in missing values in both training and test data. This naturally forms a conditional multi-output regression task that uses available sensor values to predict missing sensor values. In this test, according to an embodiment of the invention, the availability of all process inputs is assumed, as otherwise, an extra generative model is needed for x, as noted above.

28-hour operation data from a truck manufactured by a European automobile company was used. There are a total of 20 sensors installed in this truck. The following d=6 sensors were selected as inputs: ambient air temperature, ambient air pressure, altitude, fuel flow, throttle and engine speed (rpm). The M=8 outputs include road speed, engine temperature, intake manifold temperature, turbo boost pressure, charge air cooler temperature and pressure, exhaust temperature and pressure. During this operation time, the truck was running at altitudes between 100 meters and 900 meters and at speeds between 0 mph and 85 mph, providing a comprehensive snapshot of its performance. Note that the time when the engine was turned off was not considered.

There are a total of 825 data points with a resolution of about two minutes. 200 data points were randomly selected for training, with the remaining used for testing. For the 200 training data points, 5% of the output values were randomly removed to simulate the missing data cases. Note that 5% is typically much higher than the rate of a network failure or a sensor failure. This setting makes the tests more challenging than realistic applications. The number of known outputs $M_O$ was also varied from 0 to M−1=7. Such a test was repeated ten times.

Figure 8A:
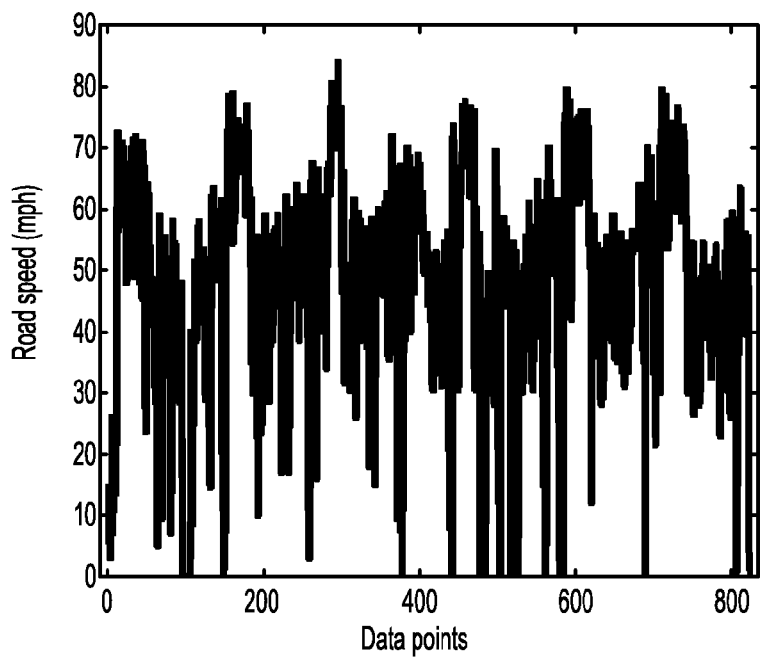
FIGS. 8(a)-(b) illustrate the truck data test, according to an embodiment of the invention.
Figure 8B:
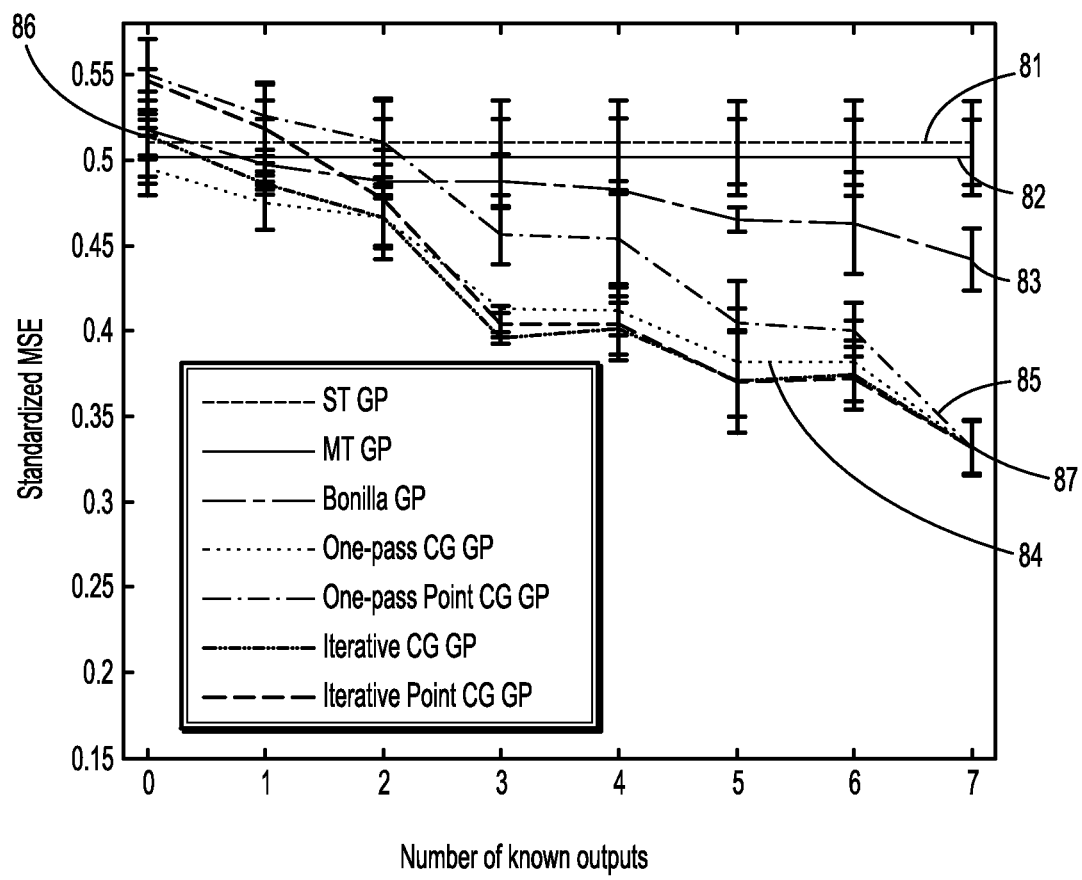

FIGS. 8(a)-(b) illustrate the truck data test. FIG. 8(a) is a graph of the road speed (miles per hour) of the truck over the 825 data points of the 28-hour operation. FIG. 8(b) is a graph of the standardized MSE results (with a one standard deviation error bar) for the different methods with the number of known outputs $M_O$ varied from 0 to 7. In FIG. 8(b), the plots are: (81) ST GP; (82) MT GP; (83) Bonilla GP; (84) One-pass CG GP; (85) One-pass Point CG GP; (86) Iterative CG GP; and (87) Iterative Point CG GP.

FIG. 8(b) shows the results of different algorithms. A One-pass CG GP according to an embodiment of the invention outperforms all previous methods. Iterative algorithms according to embodiments of the invention generally perform better than one-pass algorithms according to embodiments of the invention, especially when $M_O$ is large. However, when $M_O$ is small, such as 0 or 1, a One-pass CG GP according to an embodiment of the invention actually performs better than an Iterative CG GP according to an embodiment of the invention. This can be attributed to the fact that the available information is so limited that the iterative approach tends to become trapped in a local optima.

A One-pass Point CG GP according to an embodiment of the invention performs worse than other methods according to embodiments of the invention for almost all $M_O$ values. Its iterative version, an Iterative Point CG GP according to an embodiment of the invention is similarly poor at small $M_O$ values. However, as $M_O$ increases, its performance quickly approaches that of an iterative CG GP according to an embodiment of the invention (with Bayesian integration). This implies that with more outputs and thus more information available, the estimated posterior distribution $Q(y_m)$ becomes more sharply peaked and can be better approximated by the delta function used by the point estimation algorithm.

In general, the performances of all multi-output regression methods improve with the increase of observed outputs because more information is available. However, this is not always true. For example, from $M_O=5$ to $M_O=8$, the errors of a One-pass CG GP according to an embodiment of the invention and an Iterative CG GP according to an embodiment of the invention actually increase. This may be attributed to the fact that some outputs may be irrelevant for predicting a target output. The inclusion of such outputs, which become more likely with a larger $M_O$, may add noise to affect the performance of the regression algorithm.

Both an MT GP according to an embodiment of the invention and a Bonilla GP, two multi-task approaches, now perform better than the ST GP. The reason can be that there are several correlated temperature and pressure sensors used as outputs. It makes more sense to share parameter representation using multi-task approaches. It is also easier to model their joint predictive distribution.

In practice, the following strategy may be used to select among algorithms according to embodiments of the invention. When the number of known outputs $M_O$ is small, a One-pass CG GP algorithm according to an embodiment of the invention is used. For larger $M_O$ values, an Iterative CG GP algorithm according to an embodiment of the invention or an Iterative Point CG GP algorithm according to an embodiment of the invention is used.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
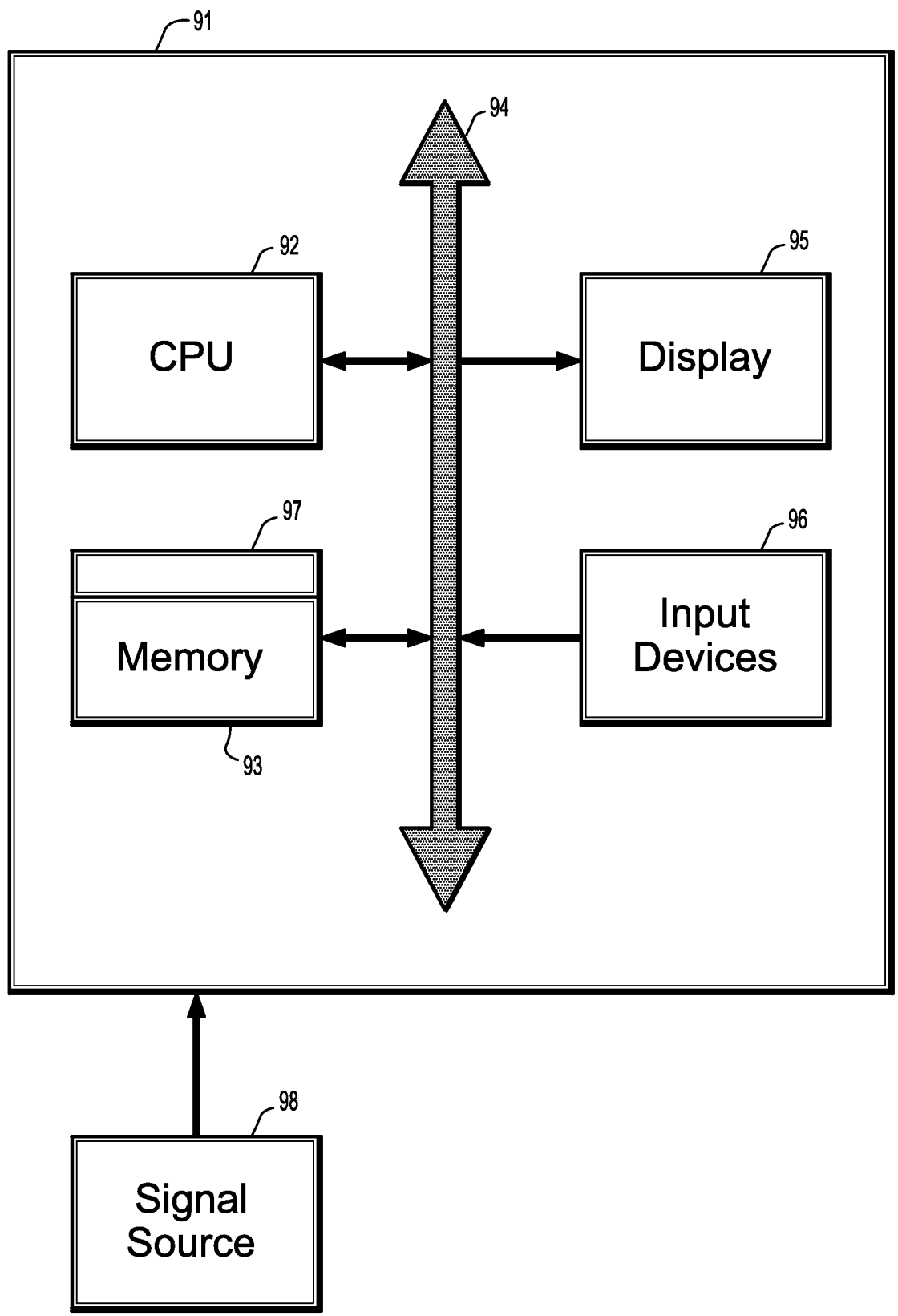
FIG. 9 is a block diagram of an exemplary computer system for implementing a method for conditional multi-output regression, according to an embodiment of the invention.

FIG. 9 is a block diagram of an exemplary computer system for implementing a method for conditional multi-output regression according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock is circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-implemented method of predicting sensor output values of a sensor monitoring system, comprising the steps of:
   providing a set of one or more test input values to a system of sensors, and one or more known sensor output values from said sensor system, wherein other sensor output values are unknown;
   calculating, using a computer, for each unknown sensor output value, a predictive Gaussian distribution function $$P(y_U \mid x) = \prod_{m \in U} P(y_m \mid x)$$
$$= \frac{1}{(2\pi)^{d/2} |S_{y_U}|^{1/2}} \exp\left(-\frac{1}{2}(y_U - \mu_{y_U})^T S_{y_U}^{-1}(y_U - \mu_{y_U})\right)$$

from the test input values, wherein vector x of dimensionality d represents the test input values, vector $y_U$ of dimensionality M represents the set of unknown output sensor output values, $y_m \in y_U$, $\mu_{y_U}$ is a vector of mean values of the set $y_U$ determined by a training phase, $S_{y_U}$ is a diagonal covariance matrix of the set $y_U$ determined by said training phase; and
   predicting each unknown output $y_m$ from $P(y_m \mid x, y_O) = \int_{y_{U\overline{m}}} P(y_m \mid x, y_{U\overline{m}}) P(y_U \mid x) dy_{U\overline{m}}$, wherein vector $y_O$ represents the known sensor output values, vector $y_{U\overline{m}}$ represents unknown output sensor values in $y_U$ except $y_m$, and $P(y_m \mid x, y_{U\overline{m}})$ is a conditional Gaussian distribution defined by
   log $P(y_m \mid x, y_{U\overline{m}}) = -\frac{1}{2} \log|K| - \frac{1}{2} y_{U\overline{m}} K^{-1} y^T_{U\overline{m}} + C$, wherein $C = -(0.5\ d)\log(2\pi)$ and K is an N×N kernel matrix defined between pairs of test input values $x_i$, $x_j$ wherein N is the number of test input values whose elements $K_{i,j}$ are defined by Gaussian kernel functions $K_{i,j} = k(x_i, x_j \mid \Lambda) = \exp(-\frac{1}{2}(x_i - x_j)^T \Lambda^{-1}(x_i - x_j))$, wherein $\Lambda = \text{diag}[\lambda_1^2, \ldots, \lambda_d^2]^T$ whose values $\lambda_i$ are determined by a training phase.

2. The method of claim 1, wherein the predictive Gaussian distribution function $P(y_m \mid x)$ for each unknown output $y_m$ is trained by maximizing log $P(Y_m \mid X_m, \theta) = -\frac{1}{2} \log|K| - \frac{1}{2} Y_m K^{-1} Y_m^T + C$ with respect to a hyperparameter $\theta = \{\lambda_1, \ldots, \lambda_d\}$, wherein $Y_m$ is a set of $N_m$ training samples of dimensionality M for sensor output values corresponding to a set $X_m$ of N training samples for sensor input values.

3. The method of claim 2, wherein
   log $P(Y_m \mid X_m, \theta) = -\frac{1}{2} \log|K| - \frac{1}{2} Y_m K^{-1} Y_m^T + C$ is maximized using a conjugate gradient method.

4. The method of claim 2, wherein the conditional Gaussian distribution $P(y_m \mid x, y_{U\overline{m}}, y_O)$ is trained by maximizing log $P(Y_m \mid X, Y_{\overline{m}}, \theta) = \frac{1}{2} \log|K| - \frac{1}{2} y_{U\overline{m}} K^{-1} y_{U\overline{m}}^T + C$ with respect to a hyperparameter $\theta = \{\lambda_1, \ldots, \lambda_{d+M-1}\}$, for the training set of input values X and output values Y, wherein $Y_{\overline{m}}$ is a (M−1)×N matrix that represents training sets for all outputs except $y_m$, wherein the Gaussian kernel functions $K_{i,j} = k(z_i, z_j \mid \Lambda) = \exp(-\frac{1}{2}(z_i - z_j)^T \Lambda^{-1}(z_i - z_j))$ wherein z is a (d+M−1) input vector that combines vectors $x \in X$ and $y_{\overline{m}} \in Y_{\overline{m}}$.

5. The method of claim 4, further comprising, when there are $N - N_m$ missing values in the set of output values $Y_m$, sampling a plurality of output values from the predictive Gaussian distribution $P(y_m \mid x)$ for each missing value in $Y_m$, and maximizing an average over the plurality of sampled values $$\frac{1}{T} \sum_{t=1}^{T} \log P(Y_m^{(t)} \mid X_m, Y_{\overline{m}}^{(t)}, \theta)$$

with respect to the hyperparameter $\theta$, wherein T is the number of the plurality of sampled values for each missing value in $Y_m$, wherein each missing value in $Y_m$ is replaced by a sampled value.

6. The method of claim 1, further comprising repeatedly calculating $$Q^{(l+1)}(y_m) = \int_{y_{U\overline{m}}} P(y_m \mid x, y_{\overline{m}}) \prod_{i \in U_{\overline{m}}} Q^{(l)}(y_i) dy_{U\overline{m}}$$

until convergence, wherein each $Q^{(1)}(y_m)$ is initialized as $Q^{(1)}(y_m) = P(y_m \mid x, y_O) = \int_{y_{U\overline{m}}} P(y_m \mid x, y_{U\overline{m}}) P(y_U \mid x) dy_{U\overline{m}}$.

7. A computer-implemented method of predicting sensor output values of a sensor monitoring system, comprising the steps of:
   providing a set of one or more test input values to a system of sensors, and one or more known sensor output values from said sensor system, wherein other sensor output values are unknown;
   calculating, using a computer, for each unknown sensor output value, a predictive distribution function $$P(y_U \mid x) = \prod_{m \in U} P(y_m \mid x)$$

from the test input values wherein $P(y_m \mid x) = \delta(y_m - \mu_{y_m})$, the Dirac delta function, wherein vector x of dimensionality d represents the test input values, vector $y_U$ of dimensionality M represents the set of unknown output sensor output values, $y_m \in y_U$, $\mu_{y_U}$ is a vector of mean values of the set $y_U$ determined by a training phase; and
   predicting each unknown output $y_m \in y_U$ from $P(y_m \mid x, y_O) = P(y_m \mid x, \mu_{y_{U\overline{m}}}, y_O)$, wherein vector $y_O$ represents the plurality of known sensor output values, vector $y_{U\overline{m}}$ represents unknown output sensor output values in $y_U$ except $y_m$, and $P(y_m|x, \mu_{y_{U\overline{m}}}, y_O)$ is a conditional Gaussian distribution defined by log $P(y_m|x, \mu_{y_{U\overline{m}}}, y_O) = -\frac{1}{2} \log|K| - \frac{1}{2}\mu_{y_{U\overline{m}}} K^{-1} \mu_{y_{U\overline{m}}} + C$, wherein $C=-(0.5\,d)\log(2\pi)$ is a constant and K is an N by N kernel matrix defined between pairs of test input values $x_i$, $x_j$ wherein N is the number of test input values whose elements $K_{i,j}$ are defined as $K_{i,j}=k(x_i, x_j|\Lambda)=\exp(-\frac{1}{2}(x_i-x_j)^T \Lambda^{-1}(x_i-x_j))$, wherein $\Lambda=\text{diag}[\lambda_1^2, \ldots, \lambda_d^2]^T$ whose values are determined by another training phase.

8. The method of claim 7, further comprising:
(a) setting to zero a variance of the Gaussian distribution $P(y_m|x, y_O)=P(y_m|x, \mu_{y_{U\overline{m}}}, y_O)$ wherein $P(y_m|x, y_O)$ becomes a Dirac delta function,
(b) calculating $$Q^{(l+1)}(y_m) = \int_{y_{U\overline{m}}} P(y_m|x, y_m) \prod_{i \in U_{\overline{m}}} Q^{(l)}(y_i) d y_{U\overline{m}},$$

wherein each $Q^{(1)}(y_m)$ is initialized as $Q^{(1)}(y_m)=P(y_m|x, y_O)=\delta(y_m-\mu_{y_m})$,
and repeating steps (a) and (b) until convergence.

9. A program storage device readable by a computer, tangibly embodying a program of instructions executable by the computer to perform the method steps for predicting sensor output values of a sensor monitoring system, the method comprising the steps of:
providing a set of one or more test input values to a system of sensors, and one or more known sensor output values from said sensor system, wherein other sensor output values are unknown;
calculating, for each unknown sensor output value, a predictive Gaussian distribution function $$P(y_U|x) = \prod_{m \in U} P(y_m|x)$$

$$= \frac{1}{(2\pi)^{d/2}|S_{y_U}|^{1/2}} \exp\left(-\frac{1}{2}(y_U - \mu_{y_U})^T S_{y_U}^{-1}(y_U - \mu_{y_U})\right)$$

from the test input values, wherein vector x of dimensionality d represents the test input values, vector $y_U$ of dimensionality M represents the set of unknown output sensor output values, $y_m \in y_U$, $\mu_{y_U}$ is a vector of mean values of the set $y_U$ determined by a training phase, $S_{y_U}$ is a diagonal covariance matrix of the set $y_U$ determined by said training phase; and
predicting each unknown output $y_m$ from $P(y_m|x, y_O) = \int_{y_{U\overline{m}}} P(y_m|x, y_{U\overline{m}}) P(y_U|x) dy_{U\overline{m}}$, wherein vector $y_O$ represents the known sensor output values, vector $y_{U\overline{m}}$ represents unknown output sensor values in $y_U$ except $y_m$, and $P(y_m|x, y_{U\overline{m}})$ is a conditional Gaussian distribution defined by log $P(y_m|x, y_{U\overline{m}}) = -\frac{1}{2} \log|K| - \frac{1}{2} y_{U\overline{m}} K^{-1} y_{U\overline{m}}^T + C$, wherein $C=-(0.5\,d)\log(2\pi)$ and K is an N×N kernel matrix defined between pairs of test input values $x_i$, $x_j$ wherein N is the number of test input values whose elements $K_{i,j}$ are defined by Gaussian kernel functions $K_{i,j}=k(x_i, x_j|\Lambda)=\exp(-\frac{1}{2}(x_i-x_j)^T \Lambda^{-1}(x_i-x_j))$, wherein $\Lambda=\text{diag}[\lambda_1^2, \ldots, \lambda_d^2]^T$ whose values $\lambda_i$ are determined by another training phase.

10. The computer readable program storage device of claim 9, wherein the predictive Gaussian distribution function $P(y_m|x)$ for each unknown output $y_m$ is trained by maximizing log $P(Y_m, X_m, \theta) = -\frac{1}{2}\log|K| - \frac{1}{2}Y_m K^{-1} Y_m^T + C$ with respect to a hyperparameter $\theta=\{\lambda_1, \ldots, \lambda_d\}$, wherein $Y_m$ is a set of $N_m$ training samples of dimensionality M for sensor output values corresponding to a set $X_m$ of N training samples for sensor input values.

11. The computer readable program storage device of claim 10, wherein log $P(Y_m|X_m, \theta) = -\frac{1}{2}\log|K| - \frac{1}{2} Y_m K^{-1} Y_m^T + C$ is maximized using a conjugate gradient method.

12. The computer readable program storage device of claim 10, wherein the conditional Gaussian distribution $P(y_m|x, y_{U\overline{m}}, y_O)$ is trained by maximizing log $P(Y_m|X, Y_{\overline{m}}, \theta) = -\frac{1}{2}\log|K| - \frac{1}{2} y_{U\overline{m}} K^{-1} y_{U\overline{m}}^T + C$ with respect to a hyperparameter $\theta=\{\lambda_1, \ldots, \lambda_{d+M-1}\}$, for the training set of input values X and output values Y, wherein $Y_{\overline{m}}$ is a (M-1)×N matrix that represents training sets for all outputs except $y_m$, wherein the Gaussian kernel functions $K_{i,j}=k(z_i, z_j|\Lambda)=\exp(-\frac{1}{2}(z_i-z_j)^T \Lambda^{-1}(z_i-z_j))$ wherein z is a (d+M-1) input vector that combines vectors $x \in X$ and $y_{\overline{m}} \in Y_{\overline{m}}$.

13. The computer readable program storage device of claim 12, the method further comprising, when there are $N-N_m$ missing values in the set of output values $Y_m$, sampling a plurality of output values from the predictive Gaussian distribution $P(y_m|x)$ for each missing value in $Y_m$, and maximizing an average over the plurality of sampled values $$\frac{1}{T} \sum_{t=1}^{T} \log P(Y_m^{(t)} | X_m, Y_{\overline{m}}^{(t)}, \theta)$$

with respect to the hyperparameter $\theta$, wherein T is the number of the plurality of sampled values for each missing value in $Y_m$, wherein each missing value in $Y_m$ is replaced by a sampled value.

14. The computer readable program storage device of claim 9, the method further comprising repeatedly calculating $$Q^{(l+1)}(y_m) = \int_{y_{U\overline{m}}} P(y_m|x, y_m) \prod_{i \in U_{\overline{m}}} Q^{(l)}(y_i) d y_{U\overline{m}}$$

until convergence, wherein each $Q^{(1)}(y_m)$ is initialized as $Q^{(1)}(y_m)=P(y_{m|x,y_O})=\int_{y_{U\overline{m}}} P(y_{m|x,y_{U\overline{m}}}) P(y_U|x) dy_{U\overline{m}}$.

* * * * *